Dec. 15, 1931.  L. NYCZ  1,836,866

SPRING TIRE FOR AUTOMOBILES

Filed Aug. 2, 1928

INVENTOR
Louis Nycz
BY
F. N. Gilbert
ATTORNEY

Patented Dec. 15, 1931

1,836,866

UNITED STATES PATENT OFFICE

LOUIS NYCZ, OF BINGHAMTON, NEW YORK

SPRING TIRE FOR AUTOMOBILES

Application filed August 2, 1928. Serial No. 296,902.

My invention relates to improvements in spring tires for automobiles, and it has for its object to provide a flexible and resilient tire for automobiles, at the same time having the requisite supporting strength and one that will support the tire structure in distended form, and also to provide an interior spring body which can be easily conformed to and mounted within the automobile tires of the present general shape and outline and also to provide a resilient interior supporting structure which can be easily repaired and the parts supplied in case of breakage.

With these objects in view my invention consists of the certain novel features of construction and arrangement of parts as will be hereinafter more particularly described and pointed out in the claims, reference being had to the accompanying drawings, in which:

The same reference characters denote like parts in each of the several figures of the drawings.

Figure 1:
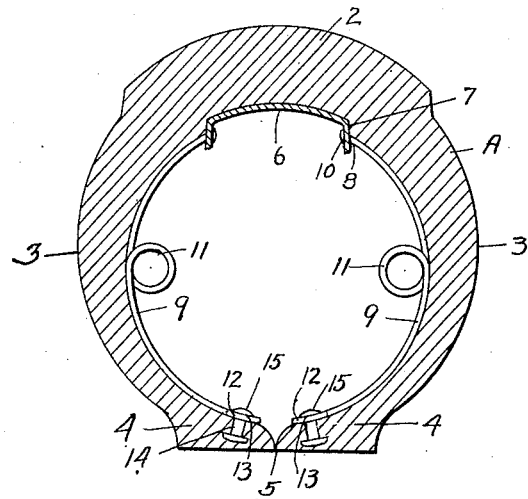
Fig. 1 is an end view in cross section of my device, mounted within an automobile tire.
Figure 2:
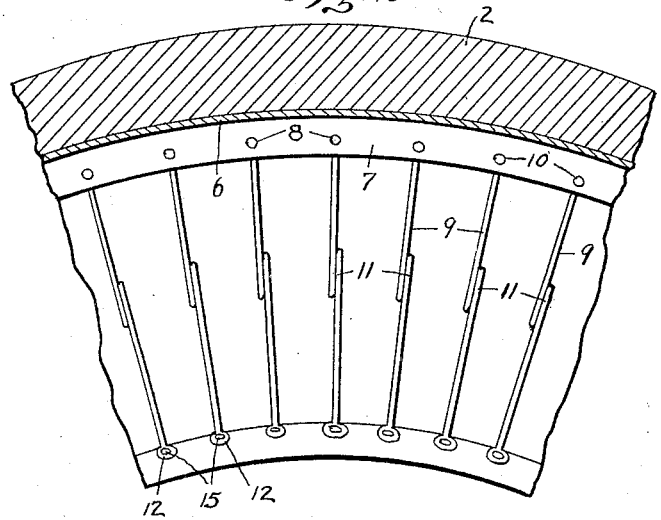
Fig. 2 is a fragmentary side view partly in cross section of my device.

In carrying out my invention and to utilize the same, I have the automobile tire body A of the usual form and structure having the tread 2 and the sides 3. 3 with the interior side projecting flange 4. 4 adjacent to the interior opening 5 of the tire body. In the construction of my device I have a metal circular rim band 6, slightly convex in cross section to conform generally in its outer surface to the interior curved surface of the tread 2. Each edge of the rim band 6 is turned over forming the vertical edges 7. 7; through the turned over edges 7. 7 I have the openings 8. 8. 8.

As a further part of my device I have the series of curved metallic ribs 9. 9. 9, these ribs are bent at their outer ends into the projecting end 10 which enters into the opening 8 and is there riveted or otherwise mounted in the edge 7. The ribs 9. 9. 9 at their center project into a ring formation 11, and thence continuing their curved outline at their inner end project into a flattened foot formation 12 having an opening therein 13. Through the side projecting flange 4 of tire A, I have an opening 14, and thru the opening 14 and opening 13, in the rib, I mount a bolt or rivet 15. In the formation of my structure I mount the curved ribs 9. 9. 9 along the edges of the rim band 6 having the ribs thus mounted and attached to the rim band, 6, then by spreading apart or opening the mouth 5 of tire A I can insert the body of my spring structure between the sides 3. 3 of tire A, until the rim band 6 is in place at the under side of the tread 2 of tire A as shown in Fig. 1. I then vertically adjust each opposite rib 9 until its inner projecting support 12 is spaced apart and is opposite the corresponding opening 13 in the side projecting flange 4. 4 of tire A. I then mount in place the rivets or bolts 15. 15 securely fastening the same in place and thus holding the lower end of the rib 9 securely against lateral movement. The structure thus securely mounted within the tire A is firmly held in place forming a secure resilient support in contact with the interior of sides 3. 3, and tread 2 of tire A.

If for any reason the rim band or any rib becomes broken, the broken part can be removed and a new part can be inserted and secured in place. This spring structure thus securely mounted within the tire A produces a distended spring support for the tire A, ready for mounting on the rear rim carrier of the automobile.

Having thus described my invention what I claim as new and for which I desire Letters Patent is as follows:

1. In a spring tire for automobiles, a tire body having inwardly disposed base flanges provided with openings therein, a resilient metallic rim band mounted within the tire body and having its edges turned over so as to form vertical flanges, curved ribs spaced apart having their outer ends secured to the flanges of the rim and bolts seated in the openings in the flanges of the tire body for securing the inner ends of the ribs in position.

2. In a spring tire for automobiles, a tire body provided with interior side projecting flanges each having a row of openings therein, a resilient metallic rim band mounted within the tire body and provided with vertical side flanges having openings therein, curved ribs spaced apart having outer laterally inwardly projecting ends secured in the openings in the rim flanges, the ribs projecting inwardly, a central circular ring formation in each rib and disposed at right angles to the rim band, and means disposed in the openings on the interior surfaces of the side flanges of the tire body for securing the inner ends of the ribs in operative position.

3. In a spring tire for automobiles, a hollow tire body having base flanges with portions inwardly directed toward each other, a resilient metallic rim band mounted within the tire beneath the tread thereof, curved spaced apart ribs secured at the outer ends to the rim band and means to secure the inner ends of the ribs to the inwardly directed portions of the flanges of the tire body, the ribs being entirely disposed within the hollow tire body.

In testimony whereof I have affixed my signature.

LOUIS NYCZ.